Jan. 16, 1962 S. W. CAHILL 3,017,019
FREE DROP CONTAINER
Filed Sept. 22, 1958
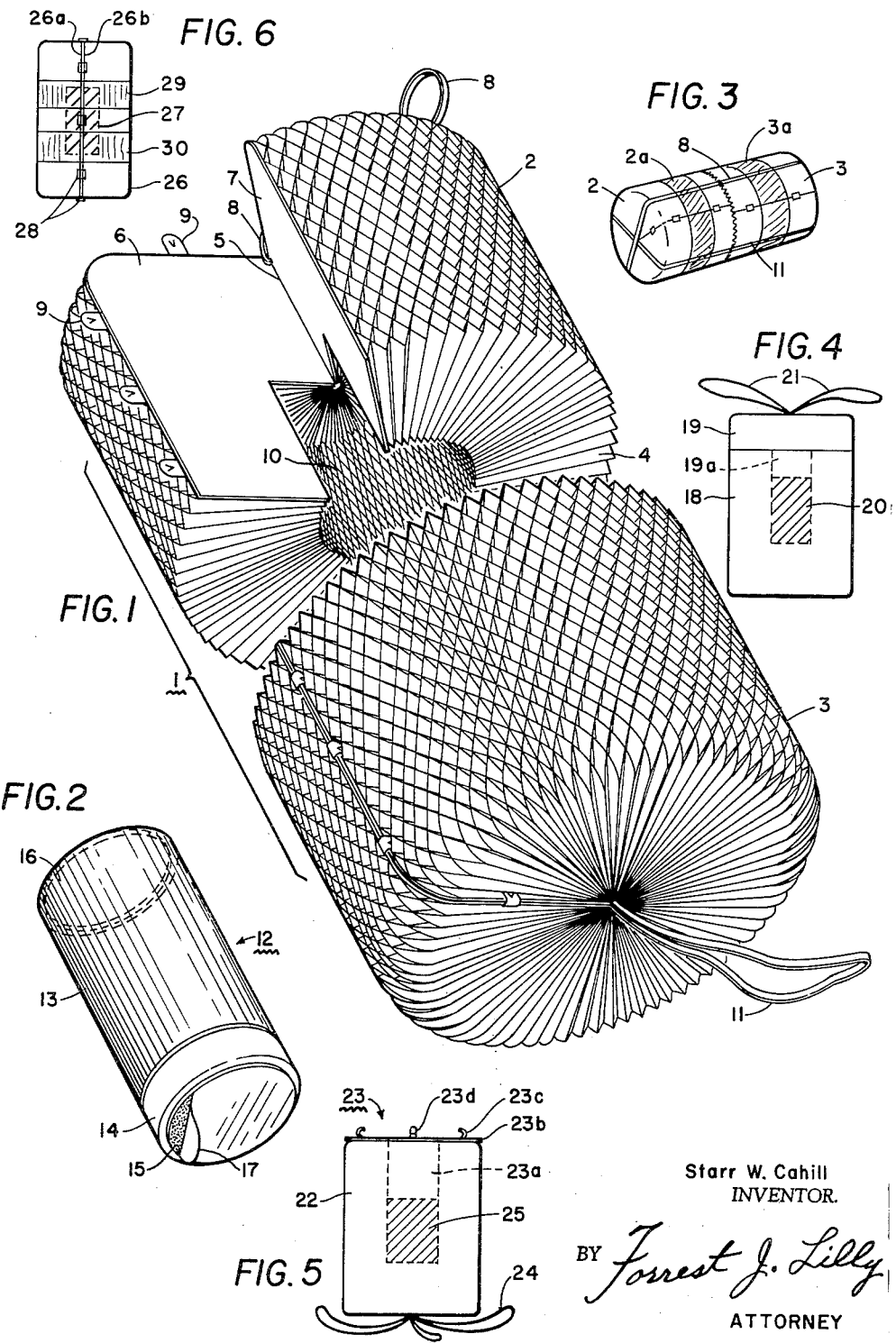
Starr W. Cahill
INVENTOR.
BY *Forrest J. Lilly*
ATTORNEY

# United States Patent Office 3,017,019
Patented Jan. 16, 1962

3,017,019
FREE DROP CONTAINER
Starr W. Cahill, Arcadia, Calif., assignor to Hycon Mfg. Company, Pasadena, Calif., a corporation of Delaware
Filed Sept. 22, 1958, Ser. No. 762,503
9 Claims. (Cl. 206—46)

My invention relates generally to containers and more particularly to a novel and useful free drop container.

Parachutes have long been used as a device for reducing the descent velocity of objects which are released from high altitude points into free space so that the objects will fall slowly to lower elevation ground points. Use of a parachute prevents damage of a released object caused by excessively strong impact with the ground. Various kinds of objects are commonly released from aircraft in flight in this manner. For example, the use of parachutes to bring living creatures, including human beings, safely to earth from an airplane in flight is well known.

Objects that are dropped from an aircraft in flight to earth on parachutes, however, require a longer time to reach ground than objects that are simultaneously free dropped. This is obviously true since the parachutes greatly reduce descent velocity of the former objects. Further, the effect of cross winds on the parachutes may cause those objects to drift randomly and eventually touch ground at points distant from those intended. When this happens, there is, of course, always the possibility and danger that the objects on parachutes may fall into an area of undesirable characteristics, such as water, which may cause loss or damage of the objects. Thus, certain objects that could withstand fairly hard impact with the ground have been free dropped where speed and accuracy in striking a ground point are important. Most objects and articles that are to be dropped quickly and accurately from aircraft in flight to the ground, however, cannot withstand the severe shock due to ground impact without some damage. Such objects may include exposed film in a canister, tools, repair parts and a variety of other similar articles.

It is an object of my invention to provide an effective shock absorbing container which is capable of containing and transporting objects such as exposed film in a canister from a point of high altitude through air to ground in a free drop without resultant damage or loss of the contents.

Another object of the invention is to provide a free drop container which is extremely lightweight and can be stowed on board aircraft in a very small package until needed when it can then be readied for immediate use in a short period of time.

A further object of my invention is to provide a free drop container which is buoyant and capable of supporting an article dropped into water or other liquid, for an extended period of time.

Briefly, and in general terms, the foregoing and other objects are preferably accomplished by providing a free drop container having two sections which can enclose a free dropped object, and the sections can be secured together by elastic and/or adhesive means. Each section includes a shaped, hollow structure formed from expandable honeycomb material. The two sections completely envelope the free dropped object when joined together and secured. The expanded material can be fabricated from waterproof material and be brightly colored. Other versions of the invention are obtained by modifying the shape and contour of one section of a container unit.

My invention possesses other objects and features, some of which together with the foregoing, will be set forth in the following detailed description of preferred embodiments of the invention. The invention will be more fully understood by reading the description with joint reference to the attached drawings, in which:

FIGURE 1 is a perspective illustrating a partially assembled free drop container according to my invention;

FIGURE 2 is a drawing illustrating a preferred canister for housing film, for example, to be free dropped in the container of FIGURE 1;

FIGURE 3 shows an assembled view of the free drop container of FIGURE 1;

FIGURE 4 shows a slightly different version of my invention;

FIGURE 5 shows another slightly modified version of my invention; and

FIGURE 6 is a drawing showing a unitary version of my invention.

A preferred embodiment of my invention is generally illustrated by the perspective of FIGURE 1. A container 1 comprises two similar expandable sections 2 and 3 which are shown respectively in partially assembled and fully assembled conditions. Each section is constructed in a manner similar to that of the well known expandable tissue paper ornaments usually found shaped as a bell. Rectangular shaped kraft paper 4, for example, are stacked together, and suitably cemented or bonded widthwise together sheet to sheet at equally spaced intervals along the length of the sheets, to form a hexagonal or diamond shaped honeycomb structure when the sheets are pulled away from each other. One side, lengthwise for example, of the stack is suitably bound together to form an axis 5 about which the secured sheets can be rotated, and cardboard faces such as 6 and 7 are cemented to the top and bottom sheets of the stack of kraft paper to support and give body to the expanded structure. Other material such as aluminum foil can be used in fabricating the honeycomb structure and ordinarily fewer sheets would be required because of the greater rigidity and strength of aluminum.

The unexpanded stack of cemented sheets 4, including cardboard faces 6 and 7, are cut to remove approximately a rectangular quarter corner section including half of axis 5 of the stack. An endless elastic band 8 is fastened at a point of the band 8 to the other end of axis 5 which was not removed. This can be accomplished, for example, by tying the band through a hole drilled through the stack at the corner near the end of the axis 5. The two faces 6 and 7 can be rotated on axis 5 in an arc 180 degrees toward each other, and when the two faces 6 and 7 meet, metal clasps 9 affixed at the free edges of cardboard face 6 are crimped over the corresponding edges of the opposite cardboard face 7. The faces 6 and 7 can additionally be cemented together or have adhesive surfaces, if desired. This forms a cylindrical honeycomb structure section 2 having a hollow stowage space 10. The other section 3 is similar, and also has an elastic band 11 secured at the end of its central rotation axis.

The two sections 2 and 3 shown in FIGURE 1 can be used to enclose an ordinary film canister 12 which comprises a can body 13 and screw cap 14, and is illustrated in FIGURE 2. The canister 12 is cylindrically shaped and fits snugly in the hollow spaces of the two container sections 2 and 3. The elastic bands 8 and 11 are stretched diametrically about opposite sections as shown in FIGURE 3 to pull and secure the two sections 2 and 3 together in a firm unit. The bands 8 and 11 are preferably positioned to intersect approximately at right angles as indicated in FIGURE 3. The canister 12 as shown in FIGURE 2 can also be used in a free drop container as described, without the use of elastic bands 8 and 11. The top of cap 14 and the bottom of the can body 13 each has an adhesive disc pad 15 and 16 respectively affixed thereto. The adhesive pad 15 (as is pad 16) is covered with a thin non-adhesive disc 17 which can be easily removed to expose the adhesive area. After the canister 12 is loaded and ready to be placed in a container, the non-adhesive disc 17 is peeled off and that end of the canister 12 is pushed into the hollow stowage space of container section 3 until the adhesive pad 15 meets and adheres to the bottom of the hollow space. The adhesive pad 16 is next exposed and the container section 2 is pushed over the other half of canister 12 until the adhesive pad 16 meets and adheres to the bottom of the hollow space 10 in container section 2. The canister 12 should, of course, be slightly longer than the combined depths of the two hollow spaces in the container sections 2 and 3. The adhesive pads such as 15 and 16 can be used in conjunction with the elastic bands 8 and 11, as a safety factor, to prevent separation of sections due to possible rupture of the bands upon impact of the container with the ground.

An unique feature of my free drop container, as is apparent from the foregoing description, is that before assembly, the container can be stored as an essentially flat, small volume article which is also relatively lightweight and can therefore be easily carried on board all kinds of airborne vehicles. Further, the free drop container can be assembled in just a few seconds into a highly efficient and effective shock absorption device. The honeycomb structure encloses an object thoroughly and equally in all directions so that the container must not necessarily strike ground in one position as required in some existing free drop containers; e.g., only at the shock absorbing sheet metal bottom of a frangible type cylindrical container. The honeycomb structure is crushed upon impact with the ground irrespective of point of contact, thus preventing injury or damage to the parts or film contained in canister 12.

The honeycomb sheets 4 can also be sprayed or impregnated with waterproofing or antiwetting material, such as lacquer, enabling the unit to float if it should fall into water. Additionally, the elastic bands 8 and 11 can be greatly increased in width and be fabricated from a thin, highly flexible material to cover a large number of honeycomb openings and thus effectively produce a number of air cells in the assembled condition. If ordinary elastic bands 8 and 11 are employed, adhesive cellophane tape can be wrapped around the sections 2 and 3 as indicated by strips 2a and 3a in FIGURE 3. These adhesive turns hold the elastic bands 8 and 11 in their right angular intersecting positions and also produce a number of air cells by closing off honeycomb openings, which increase the buoyancy of the free drop container if it should fall into water. Bright colors can be used in coating the honeycomb material and wide elastic bands so that a readily visible and large volume object will be seen. A tightly capped canister 12 will prevent liquid from entering it and at the same time add to the buoyancy of the whole container assembly.

FIGURE 4 shows an alternate version of my invention, in which the free drop container generally includes a main honeycomb body section 18 and a honeycomb lid section 19. The honeycomb body section 18 is fabricated similarly as the previously described sections 2 and 3 of FIGURE 1, except that a longer honeycomb section is used so that a deeper hollow stowage space can be obtained. The lid section 19, however, is fabricated by cutting out a rectangular quarter corner from the stocked honeycomb sheets, as before, but which quarter corner section does not include a part of the rotation axis of the structure. Thus, a lid section 19 is obtained having a central cylindrical honeycomb plug 19a which fits snugly in the hollow stowage space of body section 18. The plug 19a is sufficiently long so that the load 20 is firmly compressed when the elastic bands 21 are stretched about the body section 18. It is noted that the elastic bands 21 can be attached to the body section 18 instead of the lid section 19 as indicated in FIGURE 4. Of course, elastic bands such as 21 can be attached to both sections 18 and 19, if desired, and be stretched over opposite sections.

Another version of my invention is illustrated in FIGURE 5 wherein a honeycomb body section 22, which is similar to the body section 18 of FIGURE 4, is used with a novel lid section 23. An inflatable, generally elongated, bag 23a is attached to the light metal cover disc 23b such that the bag 23a extends into the hollow stowage space of body section 22. The bag 23a can be a fairly heavy rubber, tubular balloon, and the cover disc 23b can be fabricated from sheet aluminum, for example, having bent out prongs shaped into retaining hooks 23c. An air valve 23d connecting with bag 23a extends up through the center of cover disc 23b and is suitably mounted thereto. The inflatable bag 23a serves a similar function as the plug 19a in FIGURE 4, and additionally provides a large and effective air cell to assist and maintain flotation of the container when dropped into water. The lid 23 is held in place against the main honeycomb body section 22 by elastic bands 24 which are stretched up and over the hooks 23c. The air bag 23a is inflated sufficiently to hold load 25 firmly in position.

An unitary version of my invention is shown in FIGURE 6. Only one honeycomb section 26 is used and necessary for a complete free drop container. The honeycomb section 26 is also similar to the sections 2 and 3 of FIGURE 1, except that the rectangular cut of the honeycomb stack is made to include a center portion of the rotation axis for the honeycomb section. Thus, a central, cylindrical cavity is provided when the stack is expanded, which is the stowage space for a load 27. The space can be increased as necessary by further cutting just before the container is used. Metal tabs 28 are similar to the clasps 9 of FIGURE 1. The cardboard faces 26a and 26b are similar to faces 6 and 7 of FIGURE 1 but have adhesive areas, like the pads 15 and 16 on the ends of canister 12 (FIGURE 2). The load 27 is placed in the hollow area and the adhesive areas on the cardboard faces 26a and 26b of honeycomb section 26 are exposed by removing their protective covers. Rotation of the cardboard faces 26a and 26b about their axis toward each other produces a fully closed container when the two faces meet and adhere to each other. The tabs 28 are then bent over to secure the faces together. Air cells can be effectively formed by taping wide, thin and flexible adhesive cellophane tape strips 29 and 30 about the container as shown in FIGURE 6. These strips 29 and 30 also act to hold the container in a closed condition.

While only cylindrically shaped containers have been illustrated, spherical or cubical or any other form of free drop container can be easily produced. It is to be understood that the particular embodiments of my invention described above and shown in the drawings are merely illustrative of and not restrictive of the broad invention, and that various changes in design, structure and arrangement may be made without departing from the spirit and scope of the broader of the appended claims.

I claim:

1. A free drop shock absorbent container, comprising: a honeycomb structure expanded from a relatively small volume package of honeycomb-connected sheets bound along a common edge for expansion rotation thereon, said honeycomb structure in expanded condition defining a centrally located internal cavity for accepting a load to be free dropped, and having predetermined structural characteristics for safely delivering a free dropped load carried in the cavity from high altitudes to ground; means securing together front and back sheet faces of said honeycomb structure, contiguous in the expanded condition; and adhesive strips taped about said expanded honeycomb structure, concentric with the common edge for expansion rotation, further securing said honeycomb structure in the expanded condition and enclosing honeycomb cells to increase container buoyancy.

2. A free drop shock absorbent container, comprising: a honeycomb body structure expanded from a relatively small volume expandable package, said honeycomb body structure in expanded condition defining a recessed hollow for accepting a load to be free dropped; means securing said honeycomb body structure in the expanded condition; a lid structure for enclosing the recessed hollow; and means securing said lid structure to said honeycomb body structure, said honeycomb body structure and said lid structure having predetermined structural characteristics for safely delivering a free dropped load carried in the enclosed recessed hollow from high altitudes to ground.

3. The invention according to claim 2 wherein said means securing said lid structure to said honeycomb body structure includes elastic bands attached to at least one of said two structures and stretched about the other.

4. The invention according to claim 2 wherein said lid structure includes a disc covering the recessed hollow opening of said honeycomb body structure, and an inflatable bag attached to said cover disc, said inflatable bag positioned to extend into the recessed hollow.

5. The invention according to claim 2 wherein said lid structure includes a honeycomb cap structure expanded from a relatively small volume package, said honeycomb cap structure in expanded condition having a plug extension positioned to extend into the recessed hollow of said honeycomb body structure, and means securing said honeycomb cap structure in the expanded condition.

6. The invention according to claim 2 wherein said lid structure includes a honeycomb cap structure similar to said honeycomb body structure, said honeycomb cap structure and said honeycomb body structure being secured together to envelop the load.

7. The invention according to claim 6 wherein said means securing said lid structure to said honeycomb body structure includes a canister enveloped by said honeycomb cap structure and said honeycomb body structure, said canister having adhesive ends for adhering to contacted areas of the respective enveloping honeycomb structures.

8. The invention according to claim 6 wherein said means securing said lid structure to said honeycomb body structure includes elastic bands connected respectively to said honeycomb cap structure and said honeycomb body structure, and stretched respectively about the other.

9. The invention according to claim 8 including, in addition, adhesive strips taped respectively about said honeycomb cap structure and said honeycomb body structure, over said stretched elastic bands for securing said elastic bands in position and for enclosing honeycomb cells to increase container buoyancy.

References Cited in the file of this patent

UNITED STATES PATENTS

| | | |
|---|---|---|
| 1,891,635 | Deubel | Dec. 20, 1932 |
| 2,142,894 | Grigg | Jan. 3, 1939 |
| 2,704,904 | Maas | Mar. 29, 1955 |
| 2,728,479 | Wheeler | Dec. 27, 1955 |